US011828582B2

(12) United States Patent
Treat et al.

(10) Patent No.: US 11,828,582 B2
(45) Date of Patent: *Nov. 28, 2023

(54) IMPROVING BLAST PATTERNS (71) Applicant: X Development LLC, Mountain View, CA (US)

(72) Inventors: Neil David Treat, Los Gatos, CA (US); Thomas Peter Hunt, Oakland, CA (US); Artem Goncharuk, Mountain View, CA (US); Karen R Davis, Portola Valley, CA (US); Vikram Neal Sahney, Seattle, WA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,127

(22) Filed: Oct. 17, 2022

(65) Prior Publication Data

US 2023/0065981 A1    Mar. 2, 2023

Related U.S. Application Data (63) Continuation of application No. 16/991,757, filed on Aug. 12, 2020, now Pat. No. 11,475,659.

(Continued)

(51) Int. Cl.
*G06T 17/00*    (2006.01)
*F42D 1/00*    (2006.01)
(Continued)

(52) U.S. Cl.
CPC ............. *F42D 1/00* (2013.01); *F42D 3/04* (2013.01); *G06F 18/214* (2023.01); *G06N 3/08* (2013.01);
(Continued)

(58) Field of Classification Search
CPC .. G06T 17/00; F42D 1/00; G06N 3/08; G06V 20/13; G06V 10/25
See application file for complete search history.

(56) References Cited

U.S. PATENT DOCUMENTS 2,846,661 A    8/1958 Cunningham
4,725,991 A    2/1988 Crenwelge, Jr. et al.
(Continued)

FOREIGN PATENT DOCUMENTS

CN    103968809    8/2014
CN    107289828    10/2017
(Continued)

OTHER PUBLICATIONS

International Preliminary Report on Patentability in International Appln. No. PCT/US2020/046019, dated Feb. 24, 2022, 7 pages.
(Continued)

*Primary Examiner* — Sam Bhattacharya
(74) *Attorney, Agent, or Firm* — Fish & Richardson P.C.

(57) ABSTRACT

Techniques for improving a blast pattern at a mining site include conducting an initial blast and recording the initial blast as a high speed optical video. The high speed optical video, and the blast pattern used in the initial blast are sent as inputs to a machine learning model, which correlates one or more characteristics of the region being blasted with measurements associated with characteristics of the region being blasted obtained from the high speed optical video. The machine learning model can then determine an improved blast pattern based on the correlation made. This improved blast pattern can be displayed on a user computing device, or transmitted to a drilling system to automatically drill the improved blast pattern for subsequent blasts.

35 Claims, 5 Drawing Sheets

Related U.S. Application Data (60) Provisional application No. 62/887,259, filed on Aug. 15, 2019.

(51) Int. Cl.
*F42D 3/04* (2006.01)
*G06N 3/08* (2023.01)
*G06F 18/214* (2023.01)
*G06V 10/25* (2022.01)
*G06V 20/13* (2022.01)

(52) U.S. Cl.
CPC .............. *G06T 17/00* (2013.01); *G06V 10/25* (2022.01); *G06V 20/13* (2022.01)

(56) References Cited

U.S. PATENT DOCUMENTS

| | | | |
|---|---|---|---|
| 5,539,636 | A | 7/1996 | Marsh et al. |
| 7,418,373 | B2 | 9/2008 | Heck, Sr. |
| 9,995,843 | B2 | 6/2018 | Papillon et al. |
| 10,072,919 | B1 | 9/2018 | Srinivasan et al. |
| 2004/0028003 | A1* | 2/2004 | Diener .................. H04L 1/1664 370/373 |
| 2009/0189994 | A1 | 7/2009 | Shinnonaka |
| 2013/0152812 | A1 | 6/2013 | Brent et al. |
| 2015/0009331 | A1 | 1/2015 | Venkatrannan |
| 2015/0131079 | A1 | 5/2015 | Heinonen et al. |
| 2016/0104295 | A1 | 4/2016 | Papillon et al. |
| 2019/0147753 | A1 | 5/2019 | Hendrian et al. |
| 2019/0175276 | A1 | 6/2019 | Krimsky |
| 2021/0033586 | A1 | 2/2021 | Chadha et al. |

FOREIGN PATENT DOCUMENTS

| | | |
|---|---|---|
| CN | 109579647 | 4/2019 |
| EP | 0842391 | 2/1996 |
| WO | WO 2013/106850 | 7/2013 |
| WO | WO 2018/098584 | 8/2018 |
| WO | WO 2015/109290 | 7/2020 |

OTHER PUBLICATIONS

International Search Report and Written Opinion in International Appln. No. PCT/US2020/046019, dated Nov. 13, 2020, 40 pages.

Office Action in Australian Appln. No. 2020328017, dated Feb. 13, 2023, 3 pages.

* cited by examiner

IMPROVING BLAST PATTERNS

CROSS-REFERENCE TO RELATED APPLICATIONS

This application is a continuation of U.S. patent application Ser. No. 16/991,757, filed on Aug. 12, 2020, which claims priority under 35 U.S.C. § 119 to U.S. Provisional Patent Application Ser. No. 62/887,259, filed on Aug. 15, 2019, the entire contents of which are incorporated by reference herein.

TECHNICAL FIELD

This disclosure generally relates to determining ground characteristics at a blast site and, more particularly, determining optimal blast patterns with one or more machine learning models.

BACKGROUND

During blast mining, ore is broken into smaller, minable fragments using a series of explosive blasts. A typical method is to drill a series of blast holes in a specific arrangement, fill with an explosive at a specific depth and detonate in a specific sequence. The effectiveness of the blast at fragmenting impacts how many tons of material per hour can be extracted and thus the productivity of the mine. There are many variables that can be adjusted to improve the effectiveness of the blast based on the characteristics of and material area being blasted.

SUMMARY

This disclosure describes a system and method for improving the blast pattern at a mining site. There are a number of variables that can be modified during blasting, such as charge size, charge spacing, depth of charge, and detonation timing, among other things. All of these things can be modified to improve the fragmentation, achieving a more uniform breakup of ore material to be mined.

In an example implementation, an initial blast is conducted, and recorded as a high speed optical video. The high speed optical video, and the blast pattern used in the initial blast are sent as inputs to a machine learning model, which correlates one or more characteristics of the region being blasted with measurements associated with characteristics of the region being blasted obtained from the high speed optical video. The machine learning model can then determine an improved blast pattern based on the correlation made. This improved blast pattern can be displayed on a user computing device, or transmitted to a drilling system to automatically drill the improved blast pattern for subsequent blasts.

In an aspect combinable with the example implementation, the machine learning model can also use as an input a three dimensional (3D) block model of the region being blasted. This 3D block model can be updated or determined by the machine learning model, using the high speed optical video.

In an aspect combinable with any one of the previous aspects, subsequent blasting events occur, and improved blast pattern is used as a new initial blast pattern in the subsequent blasting events.

In an aspect combinable with any one of the previous aspects, the characteristics of the region being blasted include geology type, defect locations, density, rock hardness, or known fracture locations.

In an aspect combinable with any one of the previous aspects, the measurements associated with the characteristics of the region being blasted include at least one of fragment size, fragment velocity, fragment shape, fragment color, fragment travel distance, fracture length, fracture width, or fracture propagation rate. These measurements can be a quantified average of the entire blasting event, for example, it can be determined that 10% of the fragments are less than two inches, while 20% of the fragments are less than 8 inches, and so on.

In an aspect combinable with any one of the previous aspects, the high speed optical video is recorded at 240 frames per second or greater.

In an aspect combinable with any one of the previous aspects the machine learning model includes an artificial neural network.

In an aspect combinable with any one of the previous aspects, the machine learning model is trained on a data corpus that includes a plurality of high speed videos of blasting, the blasting occurring in a region of known geology.

In an aspect combinable with any one of the previous aspects, the high speed optical video is filmed with at least one aerial device, such as an unmanned drone or a light aircraft, which includes a high speed optical recording device.

In an aspect combinable with any one of the previous aspects, the high speed optical video can include video from more than one recording system, the recording systems can be spatially separated, creating a parallax between the two or more videos. The two or more videos can then be used to reconstruct a 3D image of the recorded event.

In an aspect combinable with any one of the previous aspects the initial and improved blast patterns include, individual charge locations, individual charge sizes, individual charge types, individual charge depth, individual detonation timing for each charge, or a total number of charges in the blast pattern.

In an aspect combinable with any one of the previous aspects, seismic data can be recorded as well as high speed optical video. The recorded seismic data can be used as an additional input to the machine learning model.

In general, innovative aspects of the subject matter described in this specification can be embodied in methods that include the actions of using a machine learning model to determine characteristics of ore. Other implementations of this aspect include corresponding systems, apparatus, and computer programs, configured to perform the actions of the methods, encoded on computer storage devices.

Example implementations according to the present disclosure may include one, some, or all of the following features. For example a method for improving the blast pattern during blast mining operations can include identifying an initial blast pattern criteria, then recording a high speed optical video of a blast conducted in accordance with the initial blast pattern criteria. The high speed optical video can then be correlated with one or more characteristics of a region being blasted. The correlation can occur using a machine learning model that includes a plurality of measurements associated with the characteristics of the region being blasted. Based on the correlation, the machine learning model can determine an improved blast pattern and present information relating to the improved blast pattern for display on a user computing device. The improved blast pattern determination may incorporate additional information such as known fractures or mineral type blocks.

The details of one or more implementations of the subject matter described in this disclosure are set forth in the accompanying drawings and the description below. Other features, aspects, and advantages of the subject matter will become apparent from the description, the drawings, and the claims.

DESCRIPTION OF DRAWINGS

FIG. 3 is a flowchart illustrating an example method for determining characteristics of ore, and altering a processing facilities operation based on the determination.

DETAILED DESCRIPTION

This disclosure describes a system and method for improving the blast pattern at a mining site. There are a number of variables that can be modified during blasting, such as charge size, charge spacing, depth of charge, and detonation timing, among other things. All of these things can be modified to improve the fragmentation, achieving a more uniform breakup of ore material to be mined.

During a blasting event, information about the geology of the region can be obtained, which can then be used to determine a better blast pattern for following blast events. One way of obtaining additional information about the geology of the region is to record video of the blast event. The video recording can be a high speed (e.g., high framerate) recording that allows for detailed analysis of fragment size, distance traveled and velocity of fragments, and amount of fragmentation, among other things. Additional information can be gathered using seismic recording of the blast event.

This additional information can be used as input to a machine learning system, which can determine an updated three dimensional (3D) model of the geology of the mine. This updated 3D model can then be used to develop an improved, or optimized blast pattern, for future blasting.

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on one or more implementations of the present specification without creative efforts shall fall within the protection scope of the implementations of the present specification.

Figure 1:
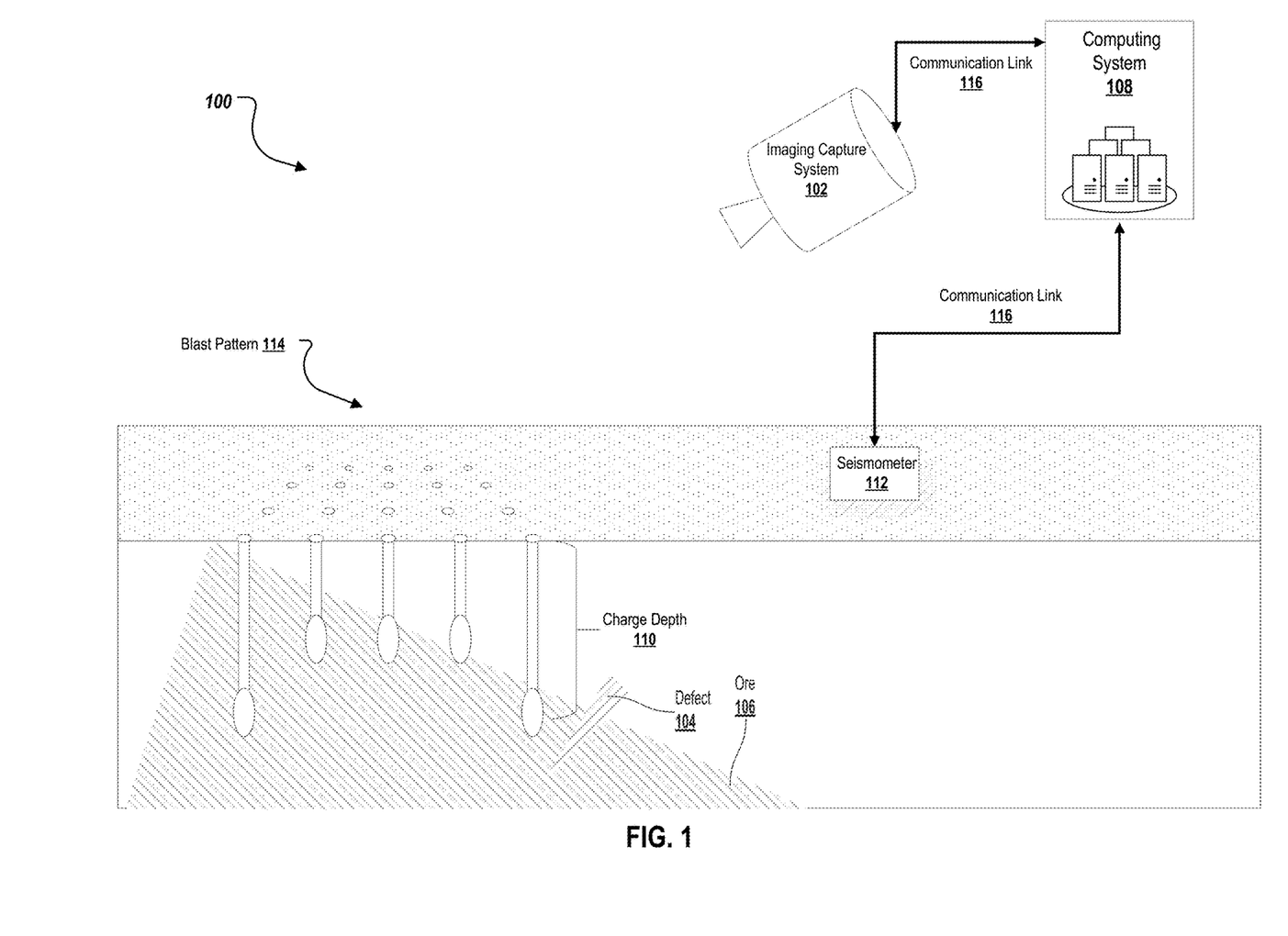
FIG. 1 depicts an example implementation of at least a portion of a blasting recording system.

FIG. 1 depicts an example implementation of at least a portion of a blasting recording system. A blast pattern 114 can be created by drilling holes in a region to be blasted.

Each hole can be drilled to a particular depth, and the hole can be loaded with a specified amount of explosives, at a specific charge depth 110. During a blast event, the region to be blasted will be fragmented, and the fragments can be removed for processing. An image capture system 102 and a seismometer 112 can record information during the blasting event, and transmit that information to a computing system 108. The computing system 108 can then determine an updated 3D block model of the region, including location containing ore 106, and the location and size of defects 104. This updated 3D block model can be used to create an improved blast pattern for future blast events.

The image capture system 102 can be a high speed optical recording system. It can capture high definition video in color (RGB) or black and white imaging. The image capture system 102 can record video at high framerates, for example, 1,000 frames per second (FPS), or 2,000 FPS, or other framerate. In some instances the image capture system 102 can record hyperspectral images (e.g., 300 nm-1000 nm wavelengths). In some implementations, the image capture system 102 can be a custom, purpose built device. In other implementations the image capture system 102 can be a commercial system, such as a Phantom v2640™ or similar device. The image capture system 102 can be mounted on a ground based platform, or an aerial platform such as a drone, or light aircraft. The image capture system 102 can comprise multiple camera systems, and record an event occurring from different angles. This multi-camera recording can be used to reconstruct a 3D image of the scene. The image capture system 102 can be communicatively coupled with a computing system 108.

The computing system 108 can be a local device, a cloud system, or a combination thereof. It can communicate with the image capture system via a communication link 116. The communication link can be, but is not limited to, a wired communication interface (e.g., USB, Ethernet, fiber optic) or wireless communication interface (e.g., Bluetooth, ZigBee, WiFi, infrared (IR), CDMA2000). The communication link 116 can be used to communicate directly or indirectly, e.g., through a network, with the computing system 108. The computing system 108 can process the information recorded by the image capture system 102.

In some implementations one or more seismometers 112 can also be used to record data during the blast event. This data can be transmitted to the computing system 108 via a communication link 116 as described above.

Figure 2:
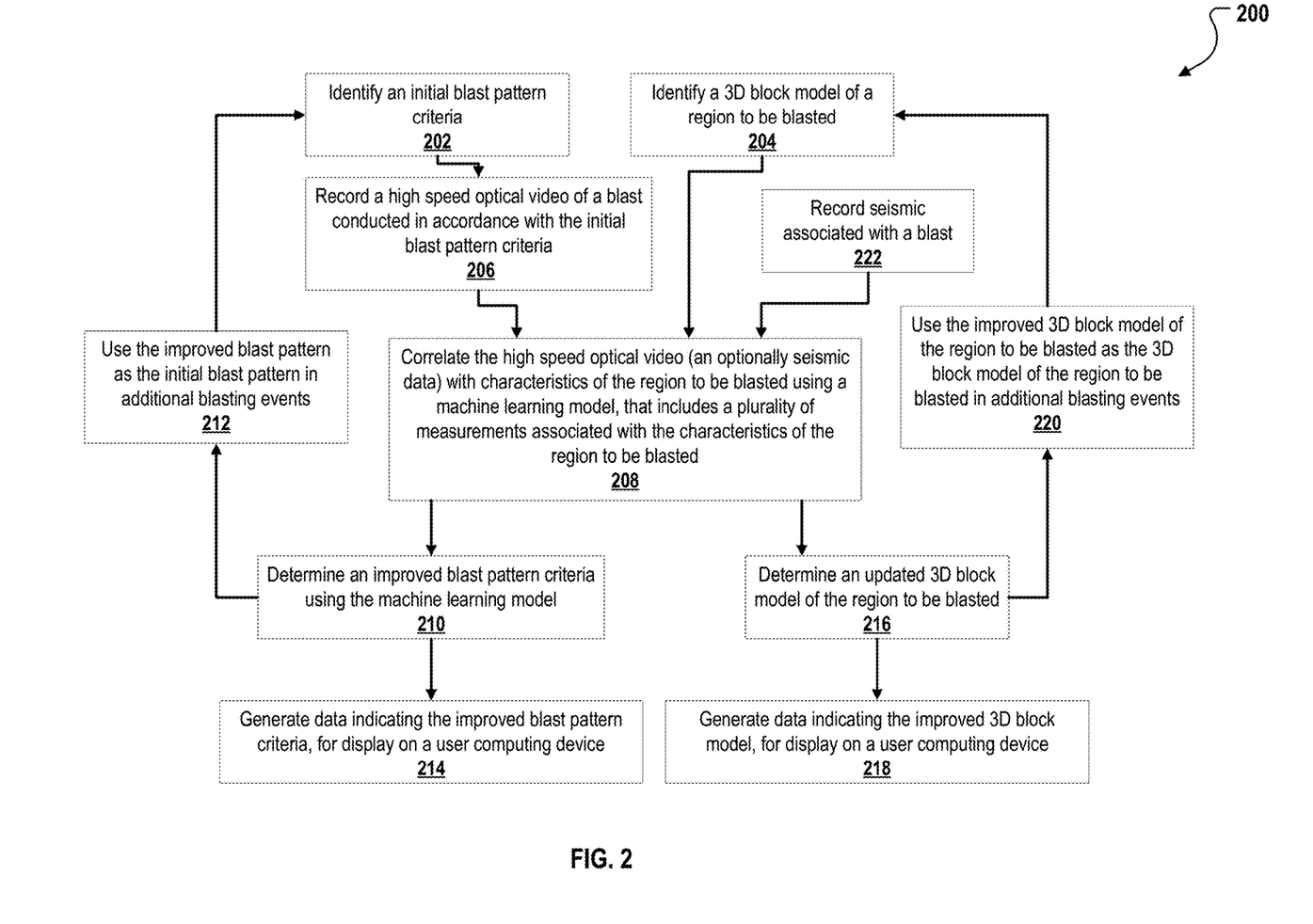
FIG. 2 is a flowchart illustrating an example method for improving blast patterns using a blast recording system.

FIG. 2 is a flowchart illustrating an example of a computer-implemented method 200 for improving blast patterns during blast mining. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

Method 200 can start at 202, where an initial blast pattern, and initial blast pattern criteria are identified. The initial blast pattern can include blasting criteria, such as charge depth, charge size, pattern geometry, detonation sequence, and number of charges, among other things. Once a blast pattern is identified, method 200 can proceed to 206.

At 206 a high speed recording is captured of a blast conducted in accordance with an initial blast pattern criteria. The blast pattern criteria can include, but is not limited to, location and pattern of charges, depth of charges, size of charges, timing sequence of detonation, and type of explosive, among other things.

An image capture system 102 can be used to record the high speed video, which can capture information regarding the detonation and fragmentation of the region being blasted. The high speed video can be recorded using a purpose built purpose built device or a commercial system, such as a Phantom v2640™ or similar device. The video can be stored in storage in the image capture system 102, or streamed directly to the computing system 108. The video can include metadata, such as timestamps on each frame, or coordinates associated with the geographic location of the camera, among other things. The video can also include audio recording, which can be recorded with a microphone integral to the image capture system 102, or as a separate component. The image capture system 102 can comprise multiple camera systems, and record an event occurring from different angles. This multi-camera recording can be used to reconstruct a 3D image of the scene. Once the high speed optical video is recorded and transmitted to the computing system 108 method 200 proceeds to step 208.

At 208, a machine learning model (discussed in detail below, and in FIG. 3) can correlate the high speed optical video with characteristics of the region being blasted. The machine learning model can, from the high speed optical video, measure parameters associated with the region being blasted. For example, the machine learning model can measure fragment size, and velocity, as well as distance and direction traveled. The machine learning model can measure fragment color and shape, in order to form a correlation between the measured parameters and characteristics of the region being blasted.

Characteristics of the region being blasted can include, but are not limited to, ore density, ground hardness/density, location of fault lines, location of defects, and ground composition, among other things. These characteristics can be used to update or determine both a 3D block model of the region (step 216), and an improved blast pattern (step 210).

Proceeding to step 210, the machine learning model determines an improved blast pattern criteria using the machine learning model. The improved blast pattern criteria can be designed to fragment the region more uniformly, or to a more desirable fragmentation size, which can improve the total material per hour extracted from the mine.

The improved blast pattern may include altering blasting criteria, such as charge depth, charge size, pattern geometry, detonation sequence, and number of charges, among other things. Once an improved blast pattern is determined, data indicating the improved pattern can be generated for display on a user computing device (214). The improved blast pattern can additionally be used for subsequent blasting events, as a new initial blast pattern (212). For example, the system can send a recommended drill pattern to the drill equipment which can then be used for a subsequent initial blast pattern (212). The improved blast pattern determination may incorporate additional information such as known fractures or mineral type blocks. Accordingly method 200 can be repeated in this manner, with each new blasting event being recorded and the blast pattern criteria improved each time.

Returning to step 204, a 3D block model of the region to be blasted can also be used as an input to the machine learning model. The 3D block model can include a three dimensional map of the region, with density and composition of the geology of the area. The 3D block model can include the location of ore, faults, defects, and different materials, among other things.

At step 216, the machine learning model can use the recorded high speed video to determine an updated 3D block model, based on the measured parameters in the video. The updated 3D block model can include more detail, or more accurate parameters regarding the geology of the region being blasted. For example, the machine learning model can determine that there is a defect near the ore to be mined, that was not previously known. This new information can be used to generate the updated 3D block model, which can inform the improved blast pattern criteria for future blasts. For example, if the defect is a soft material, the machine learning model may recommend smaller or fewer explosive charges near the defect, allowing for more uniform fracture, and less wasted explosive.

Similarly to step 214, data can be generated indicated the updated 3D block model of the region to be blasted for display on a user computing device (step 218).

Similarly to step 212, the updated 3D block model of the region to be blasted can be used in subsequent blasting events as the 3D block model of the region to be blasted (step 220).

Optionally, seismic data can be recorded and used as an input to the machine learning model (222). Seismic data can be recorded by a single ground sensor, or by an array of sensors. In one example, an array of seismometers can be used to measure the wave front of a shockwave resulting from the blast. Seismic data can additionally include airborne acoustic data, such as that which would be recorded using a microphone. This data can be used in conjunction with the high speed optical video by the machine learning model which can be used to determine geologic characteristics of the region to be blasted.

Optionally, additional post-blast video or images can be recorded (not shown). The post-blast video or images can be used to provide additional data on the effects of the blast. For example, a post blast survey conducted by a drone and can provide images of a static scene, from which fragment size, and fragment final resting place can be determined. This additional data can be incorporated into the high speed optical video, or it can be used a separate data stream to be fed to the machine learning model and processed at block 208.

Figure 3:
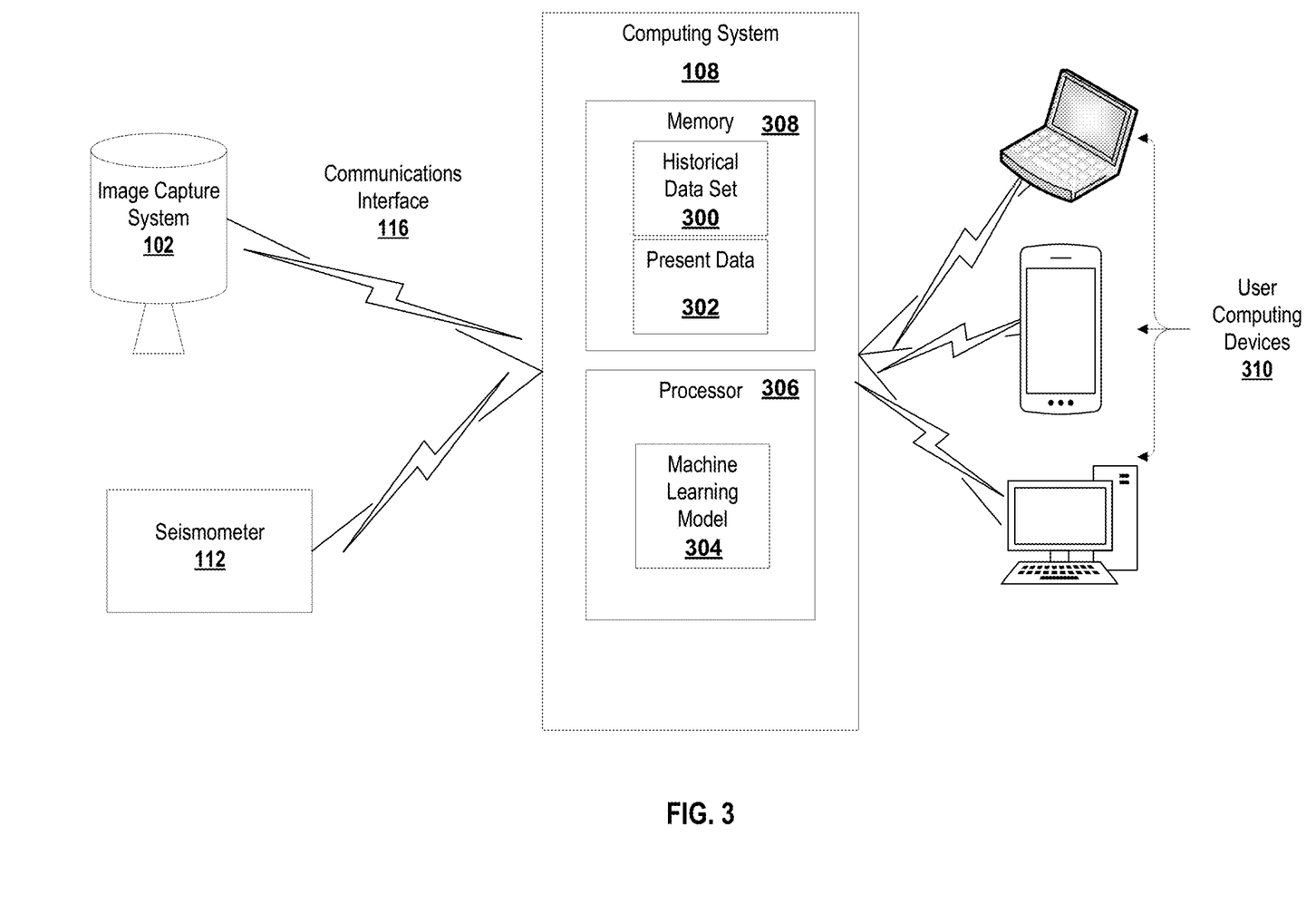
FIG. 3 depicts a computing system with a machine learning model for analyzing recordings of blasts.

FIG. 3 depicts an implementation of a computing system 108 with a machine learning model 304. In some implementations, the machine learning model 304 (or portions thereof) can be executed by the image capture system 102. In some examples, operations of the machine learning model 304 can be distributed between the image capture system 102 and the computing system 108.

The computing system 108 receives present data 302 from the image capture system 102 via the communications link 116. The computing system 108 can also receive present data 302 from other user computing devices 310, or a network. In some implementations the present data can be received in real-time. The present data 302 is then used by the machine learning model 304 to generate an output such as an updated 3D block model, and an improved blast pattern. The present data 302 can include one of, or any combination of, high speed video, hyperspectral video, seismic data, a previous 3D block model, fragment peak velocity, fragment distance traveled, fragment color, fragment size, fragment size variation, among other things.

The updated 3D block model and improved blast pattern can provide, but are not limited to, ore location and geometry, defect/fault locations, ground density, optimal charge depth, minimum required charge size, or improved detonation timing, among other things.

The machine learning model 304 may also accept as input the previous blast pattern(s) used. These parameters can include, but are not limited to, previously recorded high speed video, or previous seismic data. The previously used blast pattern parameters may be obtained via a manual input, or automatically using past system outputs, among other things.

The computing system 108 can store in memory a historical data set 300 for a region to be blasted, or a specific mine, or geographic area. The historical data set can include all data that has previously been used, such as older blast patterns, ore concentrations previously extracted, for example. In some implementations a subset of the previous data is used. The historical data set 300 can also include data relating to common trends seen across multiple blast sites in a mine, or across multiple mines, among other things.

The machine learning model 304 receives the present data 302, and the historical data 300 and generates an output. In some implementations the machine learning model 304 can provide a more efficient blast pattern. For example, the machine learning model may suggest a change of a charge depth of 6 feet to 8 feet, and an increase in amount of charges placed, in response to determining that the region to be blasted includes denser or harder material that originally estimated. The machine learning model 304 can correlate the recorded high speed video, and optionally seismic data, and determine an updated 3D model of the local area to be mined.

Upon determining an updated 3D model and an improved blast pattern, the computing system 108 can provide the information for display on a user computing device. The computing system 108 can also store the updated 3D block model, and improved blast pattern in a memory, or transmit it to a cloud storage platform. In one implementation the computing system 108 can share its output on a cloud platform with other machine learning systems, and the data can be further analyzed.

In some implementations, the machine learning model 304 incorporates additional data such as environmental factors associated with the blast site (e.g., weather, temperature, time of day, date, or location). For example, the machine learning model 304 can correlate the identified changes in the ore fragments, with the environmental factors to assist in determining the updated 3D model of the region to be blasted.

In some implementations, the machine learning model 304 is a deep learning model that employs multiple layers of models to generate an output for a received input. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model 304 is a convolutional neural network. In some implementations, the machine learning model 304 is an ensemble of models that may include all or a subset of the architectures described above.

In some implementations, the machine learning model 304 can be a feedforward autoencoder neural network. For example, the machine learning model 304 can be a three-layer autoencoder neural network. The machine learning model 304 may include an input layer, a hidden layer, and an output layer. In some implementations, the neural network has no recurrent connections between layers. Each layer of the neural network may be fully connected to the next, e.g., there may be no pruning between the layers. The neural network may include an optimizer for training the network and computing updated layer weights, such as, but not limited to, ADAM, Adagrad, Adadelta, RMSprop, Stochastic Gradient Descent (SGD), or SGD with momentum. In some implementations, the neural network may apply a mathematical transformation, e.g., a convolutional transformation or factor analysis to input data prior to feeding the input data to the network.

In some implementations, the machine learning model 304 can be a supervised model. For example, for each input provided to the model during training, the machine learning model 304 can be instructed as to what the correct output should be. The machine learning model 304 can use batch training, e.g., training on a subset of examples before each adjustment, instead of the entire available set of examples. This may improve the efficiency of training the model and may improve the generalizability of the model. The machine learning model 304 may use folded cross-validation. For example, some fraction (the "fold") of the data available for training can be left out of training and used in a later testing phase to confirm how well the model generalizes. In some implementations, the machine learning model 304 may be an unsupervised model. For example, the model may adjust itself based on mathematical distances between examples rather than based on feedback on its performance.

A machine learning model 304 can be trained to recognize patterns in a blast event when compared with the historical data, including recordings of blasts and fragments moving, and environmental parameters. In some examples, the machine learning model 304 can be trained on hundreds of recorded videos. The machine learning model 304 can be trained to identify specific characteristics of blast events, such as particle velocity, fragment size, and anomalies or defects in the fracture pattern, among other things.

The machine learning model 304 can be, for example, a deep-learning neural network or a "very" deep-learning neural network. For example, the machine learning model 304 can be a convolutional neural network. The machine learning model 304 can be a recurrent network. The machine learning model 304 can have residual connections or dense connections. The machine learning model 304 can be an ensemble of all or a subset of these architectures. The machine learning model 304 is trained to determine one or more characteristics of the blast event using the image capture system 102 based on detecting patterns from one or more of the present data 302 and the historical data set 300. The model may be trained in a supervised or unsupervised manner. In some examples, the model may be trained in an adversarial manner. In some examples, the model may be trained using multiple objectives, loss functions or tasks.

The machine learning model 304 can be configured to provide a binary output, e.g., a yes or no indication of the blast was effective, or needs improvement. In some examples, the machine learning model 304 is configured to determine multiple geological characteristics and a certainty rating for each characteristic. In some implementations the machine learning model can receive additional user constraints. For example the machine learning model can be required to find the most effective blast pattern for a region based on a maximum allowable amount of explosives.

Figure 4:
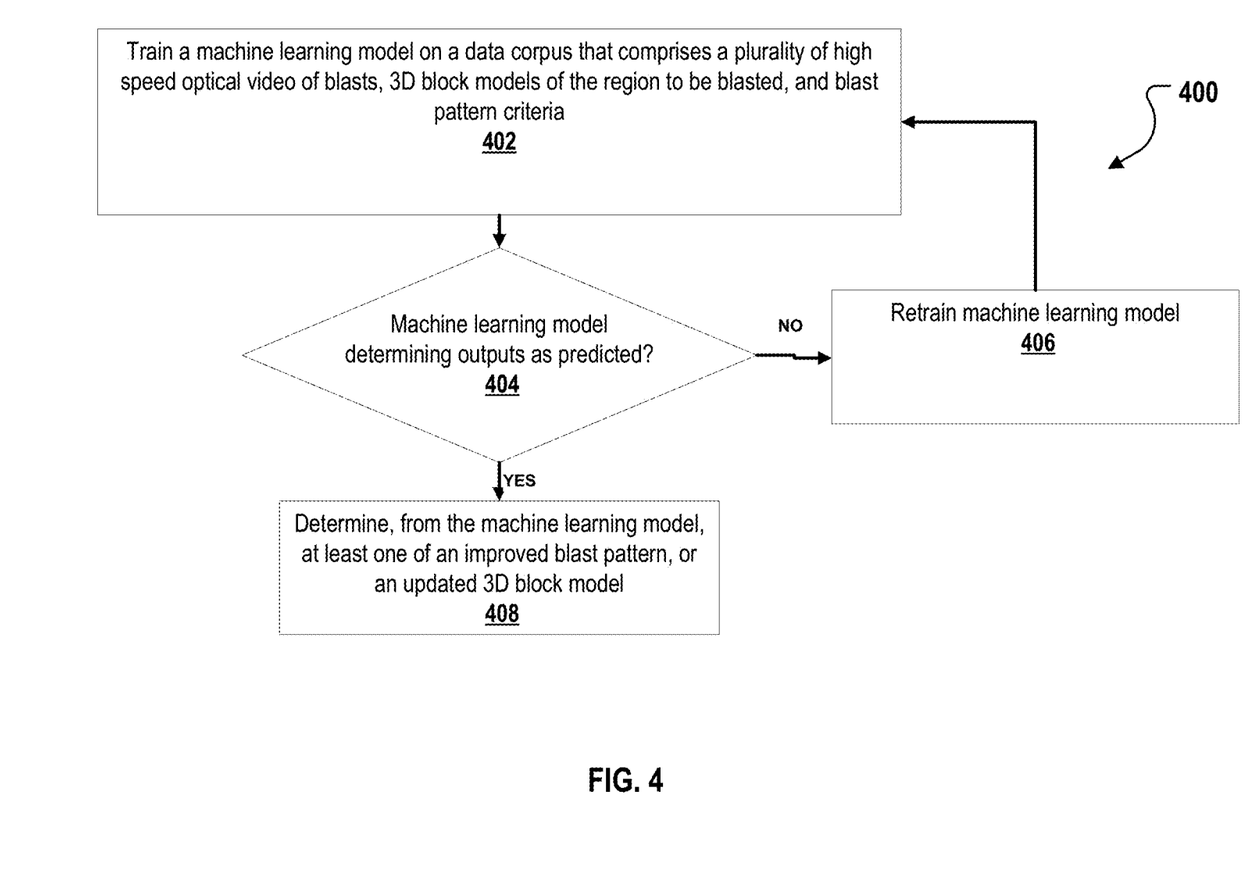
FIG. 4 is a flowchart illustrating an example method for training a machine learning system to determine an improved blast pattern.

FIG. 4 is a flowchart illustrating an example method for training a machine learning system to determine improved blast pattern criteria and updated 3D block model of the region to be blasted. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

Method 400 begins at 402. A machine learning model is trained using a data corpus of high speed optical recordings of blasts, as well as seismic data, blast pattern criteria and 3D block models. The machine learning model is then able to measure one or more parameters of the blast from the data. The blast regions in the data corpus can have one or more known characteristics, which can then be correlated by the machine learning model with the one or more measured parameters. The training effectiveness can be determined using additional data containing recordings of blasts with known characteristics, and determining if the machine learning model is able to accurately determine the characteristics. Once it is determined that the machine learning model is effectively able to correlate characteristics of the region being blasted with measured parameters, method 400 proceeds to step 404.

At step 404 a determination is made whether or not the machine learning model's previous outputs are consistent with the most recent blasting, and if retraining of the machine learning model is required. For example, if it is determined that the updated 3D block model has changed greater than a predetermined amount after each of the last 3 consecutive blasts, the machine learning model may not be operating correctly, and a new data corpus may be used to train the machine learning model. In another example, if the region to be blasted is in a new geographic location, and the geologic composition does not match that of the original data corpus the machine learning model was trained on, the machine learning model needs to be retrained. If it is determined that retraining is required, method 400 proceeds to step 406. If it is determined the machine learning model does not need retraining, method 400 proceeds to 408.

At 408 the machine learning model determines an updated 3D block model, based on the measured parameters in the video. The updated 3D block model can include more detail, or more accurate parameters regarding the geology of the region being blasted. For example, the machine learning model can determine that there is a defect near the ore to be mined, that was not previously known. This new information can be used to generate the updated 3D block model, which can inform the improved blast pattern criteria for future blasts. For example, if the defect is a soft material, the machine learning model may recommend smaller or fewer explosive charges near the defect, allowing for more uniform fracture, and less wasted explosive.

The machine learning model can also determine an improved blast pattern criteria. The improved blast pattern criteria can be designed to fragment the region more uniformly, or to a more desirable fragmentation size, which can improve the total material per hour extracted from the mine. The improved blast pattern may be determined by the machine learning model while including user identified constraints such as maximum cost, maximum pattern complexity (for example only 3 levels of depth are permitted) or maximum quantity of charges to be placed. The improved blast pattern may include altering blasting criteria, such as charge depth, charge size, pattern geometry, detonation sequence, and number of charges, among other things. Once an improved blast pattern is determined, data indicating the improved pattern can be generated for display on a user computing device (214). The improved blast pattern can additionally be used for subsequent blasting events, as a new initial blast pattern (212). Accordingly method 200 can be repeated in this manner, with each new blasting event being recorded and the blast pattern criteria improved each time.

Returning to 404, if it was determined that the machine learning model needs to be retrained, method 400 proceeds to step 406. At 406, the machine learning model is retrained. Method 400 returns to step 402, and training begins again. The retraining of the machine learning model can include the original data corpus, or a new data corpus or a combination thereof.

Figure 5:
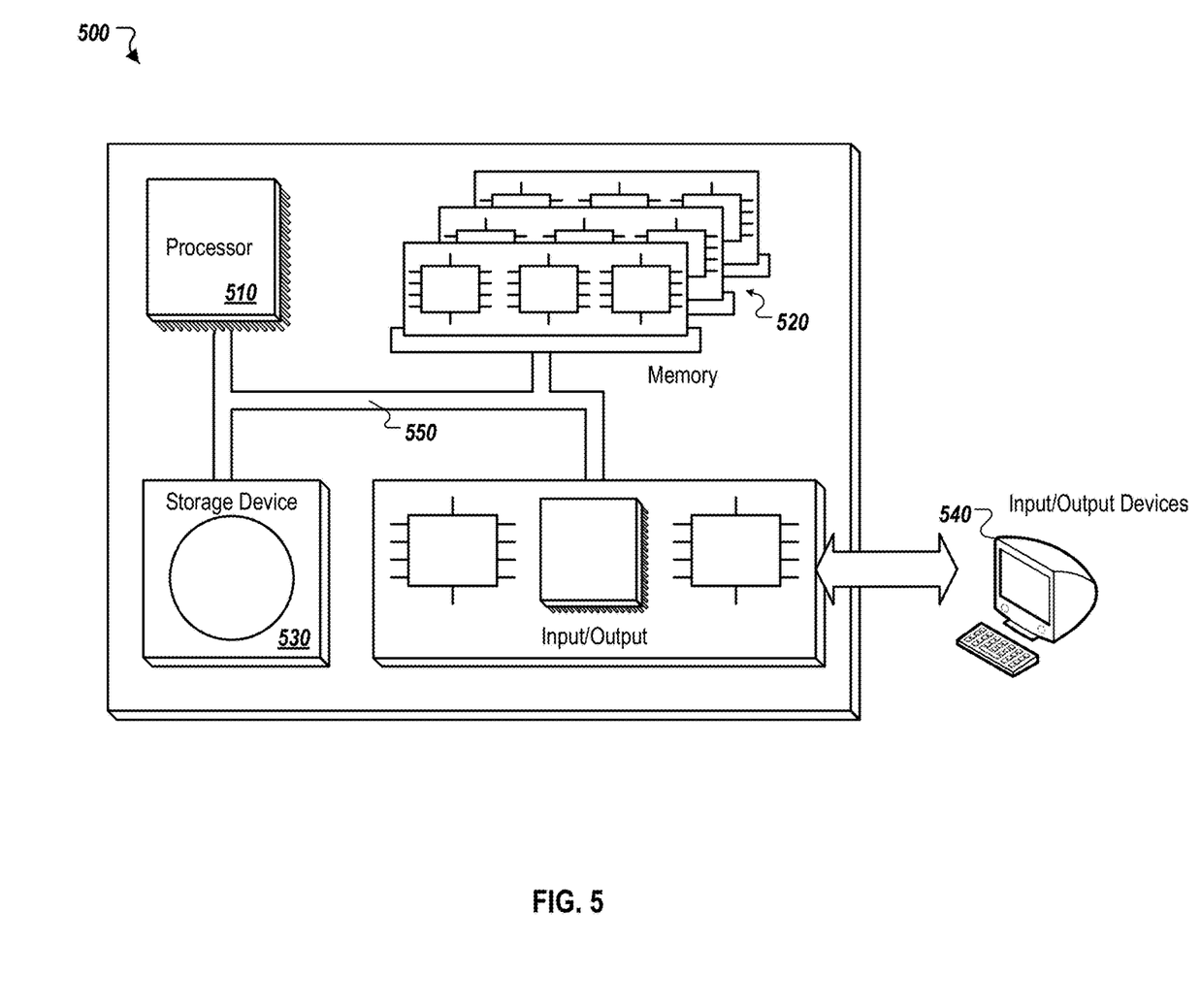
FIG. 5 depicts a computing system for a blast pattern optimization system.

FIG. 5 is a schematic diagram of a computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., computing system 108) and their structural equivalents, or in combinations of one or more of them. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). The machine learning model can run on Graphic Processing Units (GPUs) or custom machine learning inference accelerator hardware.

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for blasting, comprising:
   identifying an initial blast pattern criteria;
   receiving a high speed optical video of a blast conducted in accordance with the initial blast pattern criteria;
   determining, by a machine learning model, one or more characteristics of an identified blasting region by correlating the high speed optical video with a plurality of measurements associated with the blasting region; and generating for display on a user computing device, data indicating the one or more characteristics.

2. The method of claim 1, further comprising:
identifying a three dimensional (3D) block model of the blasting region;
determining, by the machine learning model and based on the correlation, an updated 3D block model of the blasting region; and
generating for display on a user computing device, data indicating the updated 3D block model of the blasting region.

3. The method of claim 1, further comprising:
determining, by the machine learning model and based on the characteristics of the blasting region, and improved blast pattern criteria; and
using the improved blast pattern criteria as the initial blast pattern criteria in additional blasting events.

4. The method of claim 1, wherein the one or more characteristics of the blasting region comprises at least one of geology type, defect locations, density, or rock hardness.

5. The method of claim 1, wherein the measurements associated with the characteristics of the blasting region comprise at least one of fragment size, fragment velocity, fragment shape, fragment color, fragment travel distance, fracture length, fracture width, or fracture propagation rate.

6. The method of claim 1, wherein the machine learning model comprises an artificial neural network.

7. The method of claim 1, wherein the machine learning model is trained on a data corpus that comprises a plurality of high speed videos of blasting, wherein the blasting occurs in a region of known geology.

8. The method of claim 1, wherein the high speed optical video is filmed with an aerial filming device.

9. The method of claim 8, wherein the aerial filming device comprises:
an unmanned drone; and
a high speed optical recording device.

10. The method of claim 1, wherein the initial blast pattern criteria comprise at least one of:
a location for each of a plurality of charges;
a size of each charge;
a type of each charge;
a number of charges in the plurality of charges;
a depth of each charge; or
a detonation timing for each charge.

11. The method of claim 10, wherein correlating the high speed optical video with one or more characteristics of the blasting region further comprises providing seismic data associated with the blast as input to the machine learning model.

12. A non-transitory computer readable storage medium storing instructions that, when executed by at least one processor, cause the at least one processor to perform operations comprising:
identifying an initial blast pattern criteria;
receiving a high speed optical video of a blast conducted in accordance with the initial blast pattern criteria;
determining, by a machine learning model, one or more characteristics of an identified blasting region by correlating the high speed optical video with a plurality of measurements associated with the blasting region; and
generating for display on a user computing device, data indicating the one or more characteristics.

13. The computer readable medium of claim 12, wherein the operations further comprise:
identifying a three dimensional (3D) block model of the blasting region;
determining, by the machine learning model and based on the correlation, an updated 3D block model of the blasting region; and
generating for display on a user computing device, data indicating the updated 3D block model of the blasting region.

14. The computer readable medium of claim 12, wherein the operations further comprise:
determining, by the machine learning model and based on the characteristics of the blasting region, an improved blast pattern criteria; and
using the improved blast pattern criteria as the initial blast pattern criteria in additional blasting events.

15. The computer readable medium of claim 14, wherein the improved blast pattern criteria is an optimized blast pattern criteria.

16. The computer readable medium of claim 12, wherein the one or more characteristics of the blasting region comprises at least one of geology type, defect locations, density, or rock hardness.

17. The computer readable medium of claim 12, wherein the measurements associated with the characteristics of the blasting region comprise at least one of fragment size, fragment velocity, fragment shape, fragment color, or fragment travel distance.

18. The computer readable medium of claim 12, wherein the high speed optical video is filmed at greater than 240 frames per second (FPS).

19. The computer readable medium of claim 12, wherein the machine learning model is trained on a data corpus that comprises a plurality of high speed videos of blasting, wherein the blasting occurs in a region of known geology.

20. The computer readable medium of claim 12, wherein the high speed optical video is filmed with an aerial filming device.

21. The computer readable medium of claim 12, wherein the initial blast pattern criteria comprise at least one of:
a location for each of a plurality of charges;
a size of each charge;
a type of each charge;
a number of charges in the plurality of charges;
a depth of each charge; or
a detonation timing for each charge.

22. The computer readable medium of claim 12, wherein the operation of correlating the high speed optical video with one or more characteristics of the blasting region further comprises providing seismic data associated with the blast as input to the machine learning model.

23. A blast mining system, comprising:
one or more processors;
one or more tangible, non-transitory media operably connectable to the one or more processors and storing instructions that, when executed, cause the one or more processors to perform operations comprising:
identifying an initial blast pattern criteria;
receiving a high speed optical video of a blast conducted in accordance with the initial blast pattern criteria;
determining, by a machine learning model, one or more characteristics of an identified blasting region by correlating the high speed optical video with a plurality of measurements associated with the blasting region; and
generating for display on a user computing device, data indicating the one or more characteristics.

24. The system of claim 23, wherein the operations further comprise:

identifying a three dimensional (3D) block model of the blasting region;

determining, by the machine learning model and based on the correlation, an updated 3D block model of the blasting region; and generating for display on a user computing device, data indicating the updated 3D block model of the blasting region.

25. The system of claim 23, wherein the operations further comprise:

determining, by the machine learning model and based on the characteristics of the blasting region, an improved blast pattern criteria; and using the improved blast pattern criteria as the initial blast pattern criteria in additional blasting events.

26. The system of claim 25, wherein the improved blast pattern criteria is an optimized blast pattern criteria.

27. The system of claim 25, wherein the improved blast pattern is automatically transmitted to a drilling system for subsequent drilling and blasting events.

28. The system of claim 23, wherein the one or more characteristics of the blasting region comprises at least one of geology type, defect locations, density, or rock hardness.

29. The system of claim 23, wherein the measurements associated with the characteristics of the blasting region comprise at least one of fragment size, fragment velocity, fragment shape, fragment color, or fragment travel distance.

30. The system of claim 23, wherein the machine learning model comprises an artificial neural network.

31. The system of claim 23, wherein the machine learning model is trained on a data corpus that comprises a plurality of high speed videos of blasting, wherein the blasting occurs in a region of known geology.

32. The system of claim 23, wherein the high speed optical video is filmed with an aerial filming device.

33. The system of claim 23, wherein the initial blast pattern criteria comprise at least one of:

a location for each of a plurality of charges;

a size of each charge;

a type of each charge;

a number of charges in the plurality of charges;

a depth of each charge; or a detonation timing for each charge.

34. The system of claim 23, wherein the operation of correlating the high speed optical video with one or more characteristics of the blasting region further comprises providing seismic data associated with the blast as input to the machine learning model.

35. The system of claim 23, wherein the high speed optical video comprises at least two videos recorded in at least two different locations.

* * * * *